United States Patent
Kim et al.

(10) Patent No.: US 9,682,543 B2
(45) Date of Patent: *Jun. 20, 2017

(54) SYSTEM FOR LAMINATING OPTICAL FILM AND METHOD FOR MANUFACTURING DISPLAY UNIT USING THE SAME

(71) Applicant: LG Chem, Ltd., Seoul (KR)

(72) Inventors: Kyoung-Sik Kim, Daejeon (KR); Eung-Jin Jang, Daejeon (KR); Suk-Jae Lee, Daejeon (KR); Kyoung-Ho Cho, Daejeon (KR); Cheon-Ho Park, Daejeon (KR); Won-Cheul Ju, Daejeon (KR); Beom-Seok Lee, Daejeon (KR); Jea-Han Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 109 days.

This patent is subject to a terminal disclaimer.

(21) Appl. No.: 14/537,428

(22) Filed: Nov. 10, 2014

(65) Prior Publication Data
US 2015/0190998 A1    Jul. 9, 2015

Related U.S. Application Data

(63) Continuation of application No. PCT/KR2014/003606, filed on Apr. 24, 2014.

(30) Foreign Application Priority Data

Jan. 8, 2014  (KR) .................. 10-2014-0002582
Mar. 10, 2014 (KR) .................. 10-2014-0027932

(51) Int. Cl.
*B32B 37/00* (2006.01)
*B32B 38/18* (2006.01)
(Continued)

(52) U.S. Cl.
CPC ........ *B32B 38/1816* (2013.01); *B32B 37/182* (2013.01); *B32B 38/18* (2013.01);
(Continued)

(58) Field of Classification Search
CPC ............. G02F 1/1303; G02F 1/133528; B32B 38/1816; B32B 38/185
See application file for complete search history.

(56) References Cited

U.S. PATENT DOCUMENTS 7,022,204 B2 *  4/2006  Kanbara ............... B32B 37/182
                                                         156/235
8,040,469 B2 * 10/2011  Nakamura .......... H01L 51/0004
                                                         313/512
(Continued)

FOREIGN PATENT DOCUMENTS

CN         1470890 A        1/2004
CN         1737649 A        2/2006
(Continued)

*Primary Examiner* — John Goff
(74) *Attorney, Agent, or Firm* — Dentons US LLP

(57) ABSTRACT

A system for laminating an optical film according to an exemplary embodiment of the present disclosure includes a panel transfer unit to transfer a panel, a first laminating unit installed on a transfer line of the panel to laminate an optical film on a first surface of the panel along a first direction parallel to a transfer direction of the panel, and a second laminating unit installed on the transfer line of the panel to laminate an optical film full-cut into a predetermined length on a second surface of the panel along a direction perpendicular to the first direction.

15 Claims, 11 Drawing Sheets

(51) Int. Cl.
 *B32B 37/18* (2006.01)
 *B32B 38/00* (2006.01)

(52) U.S. Cl.
 CPC ....... *B32B 38/0004* (2013.01); *B32B 2307/40* (2013.01); *B32B 2457/20* (2013.01); *Y10T 156/125* (2015.01); *Y10T 156/1322* (2015.01); *Y10T 156/1754* (2015.01)

(56) References Cited

U.S. PATENT DOCUMENTS

| | | | |
|---|---|---|---|
| 8,172,631 B2 * | 5/2012 | Hirata | B29D 11/0073 |
| | | | 349/96 |
| 2005/0016670 A1 | 1/2005 | Kanbara et al. | |
| 2009/0218049 A1 | 9/2009 | Kanbara et al. | |
| 2010/0206485 A1 * | 8/2010 | Kodera | B29C 63/024 |
| | | | 156/358 |
| 2010/0288441 A1 | 11/2010 | Kitada et al. | |
| 2011/0025958 A1 | 2/2011 | Koship et al. | |
| 2011/0047775 A1 * | 3/2011 | Koshio | B32B 37/182 |
| | | | 29/428 |

FOREIGN PATENT DOCUMENTS

| | | | |
|---|---|---|---|
| CN | 100365450 C | | 1/2008 |
| JP | 2002337818 A | * | 11/2002 |
| JP | 2009-061498 | | 3/2006 |
| JP | 2012-068641 | | 4/2012 |
| KR | 10-2004-0002796 | | 1/2004 |
| KR | 10-2010-0088036 | | 8/2010 |
| TW | M356132 U | | 5/2009 |
| TW | I373445 B | | 10/2012 |

\* cited by examiner

<UPPER SURFACE>

SYSTEM FOR LAMINATING OPTICAL FILM AND METHOD FOR MANUFACTURING DISPLAY UNIT USING THE SAME

This application is a Continuation Bypass of International Application No. PCT/KR2014/003606, filed Apr. 24, 2014, and claims the benefit of Korean Application No. 10-2014-0002582, filed on Jan. 8, 2014, and Korean Application No. 10-2014-0027932, filed Mar. 10, 2014, all of which are hereby incorporated by reference in their entirety for all purposes as if fully set forth herein.

TECHNICAL FIELD

The present disclosure relates to a system for laminating an optical film and a method for manufacturing a display unit using the same, and more particularly, to a system for attaching an optical film that may increase procedural efficiency and efficiency in aspect of spatial utilization in a process of attaching an optical film onto both surfaces of a panel constituting a display device, and a method for manufacturing a display unit using the same.

BACKGROUND ART

For use in a display device, a display unit implemented by attaching an optical film such as a polarizing film onto both surfaces of a panel is manufactured by a manufacturing system, and FIG. 1 illustrates conceptually a part of a system for manufacturing a display unit according to a related art, and FIG. 2 illustrates a process of manufacturing a display unit using a manufacturing system.

Referring to FIGS. 1 and 2, a display unit is obtained by providing, to a panel 3, an optical film 2 with a release sheet 1 attached on one surface using a roll, cutting the optical film 2 into a size corresponding to the panel 3, and laminating the optical film 2 on one surface of the panel while removing the release sheet 1 attached to the optical film 2, and subsequently, laminating the optical film 2 on the other surface of the panel 3 through the same process.

However, in the case of the process of manufacturing a display unit according to the related art, a process of reversing the panel 3 is needed, hence efficiency of the process may reduce.

Meanwhile, referring to FIG. 3, in case in which the optical film 2 to be attached to the panel 3 corresponds to a polarizing film, when attaching a polarizing film onto both surfaces of the panel 3, polarizing films should be attached such that absorption axes are perpendicular to each other, and to do so, a process of rotating the panel 3 is also needed.

To perform this additional process, addition of an apparatus for reversing/rotating the panel is required, and the addition of the apparatus results in an increased process line length, causing a reduction in spatial efficiency.

DISCLOSURE

Technical Problem

The present disclosure is designed to solve the above problem, and therefore, the present disclosure is directed to increasing process efficiency in a process of attaching an optical film onto both surfaces of a panel.

However, the object of the present disclosure is not limited to the above object, and other objects of the present disclosure will become apparent to those skilled in the art from the following description.

Technical Solution

To achieve the above object, a system for laminating an optical film according to an exemplary embodiment of the present disclosure includes a panel transfer unit to transfer a panel, a first laminating unit installed on a transfer line of the panel to laminate an optical film on a first surface of the panel along a first direction parallel to a transfer direction of the panel, and a second laminating unit installed on the transfer line of the panel to laminate an optical film full-cut into a predetermined length on a second surface of the panel along a direction perpendicular to the first direction.

The panel transfer unit may include a conveyor belt to support and convey the panel.

The panel transfer unit may include a transfer roller to support and convey the panel.

The panel transfer unit may have a width corresponding to a width of the panel.

The first laminating unit may include a first supply roll to supply the optical film, and a laminating roll to laminate the supplied optical film on the panel.

The first laminating unit may include a release sheet remover disposed between the first supply roll and the laminating roll to separate the release sheet attached to the optical film.

The first laminating unit may include a collector roll to collect the release sheet separated from the optical film.

The first laminating unit may include a first cutter disposed between the first supply roll and the release sheet remover to half-cut the optical film into a predetermined length.

The first laminating unit may include a first supply roll to supply the optical film, and a laminating drum to laminate the supplied optical film on the panel.

The second laminating unit may include a second supply roll to supply the optical film along a direction perpendicular to the panel, a direction change roll to change a direction to allow the optical film supplied by the supply roll to move along a direction parallel to the panel on the second surface of the panel, and a laminating drum disposed between the optical film and the second surface of the panel.

The second laminating unit may include a film holder disposed opposite to the laminating drum across the optical film to hold the release sheet to allow the release sheet attached to the optical film to be separated.

The second laminating unit may include a second cutter disposed between the second supply roll and the film holder to full-cut the optical film into a predetermined length.

The laminating drum may separate and adsorb the optical film held by the film holder and may laminate the optical film on the second surface of the panel.

The laminating drum may have an adsorption hole formed on a periphery.

An adsorption pad may be attached onto the periphery of the laminating drum.

The second laminating unit may include a film cartridge to contain a plurality of full-cut optical films, a film holder to hold an optical film transferred from the film cartridge, and a laminating drum to separate and adsorb the optical film held by the film holder and laminate the optical film on the second surface of the panel.

Meanwhile, the above object may be also achieved by a method for manufacturing a display unit according to an exemplary embodiment of the present disclosure, and the method for manufacturing a display unit includes (a) supplying a panel for manufacturing a display unit, (b) laminating an optical film on a first surface of the supplied panel, and (c) laminating an optical film full-cut into a predetermined length on a second surface of the panel along a direction perpendicular to a laminating direction of the optical film on the first surface.

The step (c) may be performed simultaneously or sequentially with the step (b).

The step (c) may include (c1) supplying the optical film along a direction perpendicular to the panel, (c2) changing a direction to allow the supplied optical film to move along a direction parallel to the panel, and (c3) laminating the optical film having a change in movement direction on the panel.

The step (c3) may be performed using a laminating drum which separates the optical film from a release sheet and laminates the optical film on the panel.

Advantageous Effects

According to the present disclosure, in a process of attaching an optical film onto both surfaces of a panel, process efficiency may be increased.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, an entire construction of a system for laminating an optical film according to an exemplary embodiment of the present disclosure is described with reference to FIG. 5.

Figure 1:
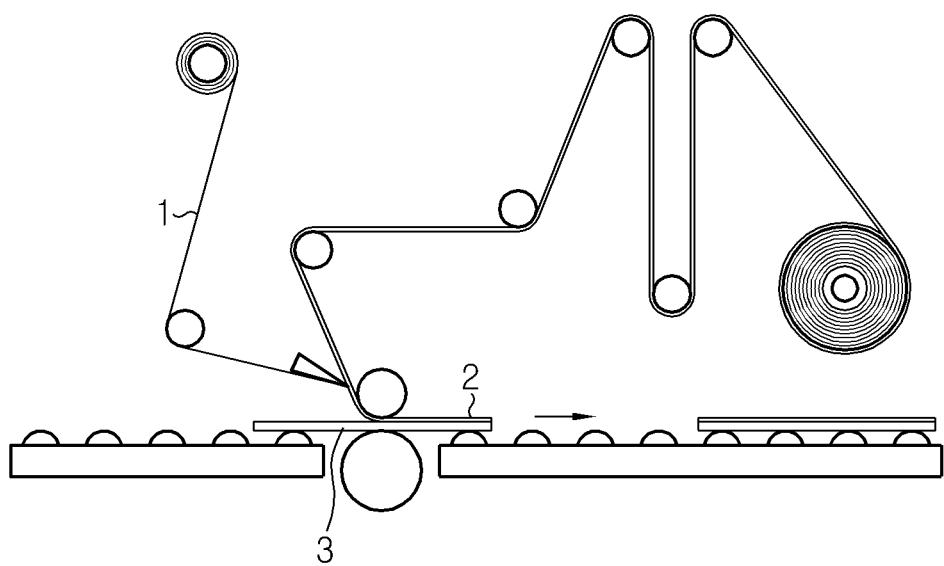
FIG. 1 is a conceptual diagram illustrating a system for laminating an optical film according to a related art.
Figure 2:
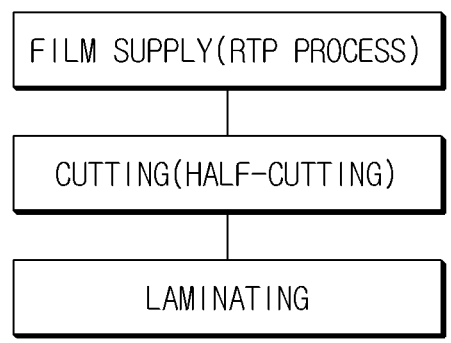
FIG. 2 is a flowchart illustrating a process according to a related art using the system for laminating an optical film shown in FIG. 1.
Figure 3:
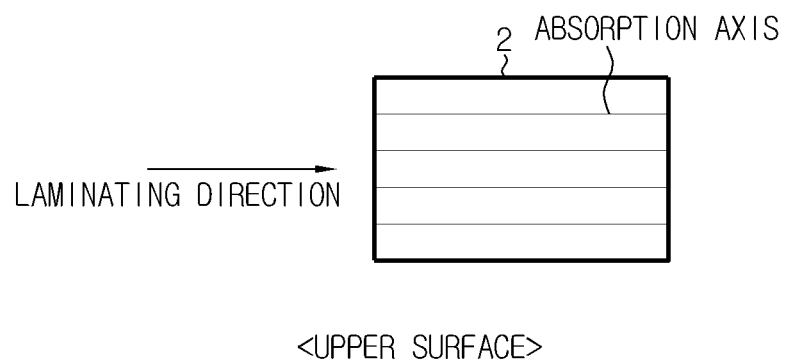
FIGS. 3 and 4 are diagrams illustrating a direction in which absorption axes of a pair of polarizing films each attached onto both sides of a panel shown in FIG. 1 are formed.
Figure 4:
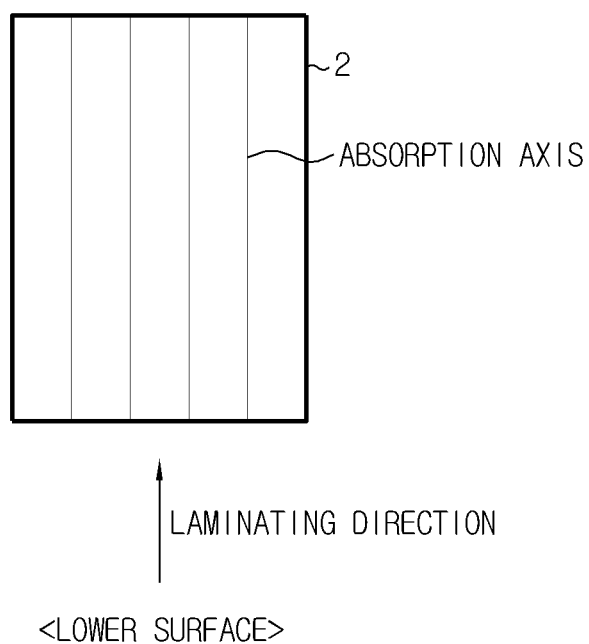
Figure 5:
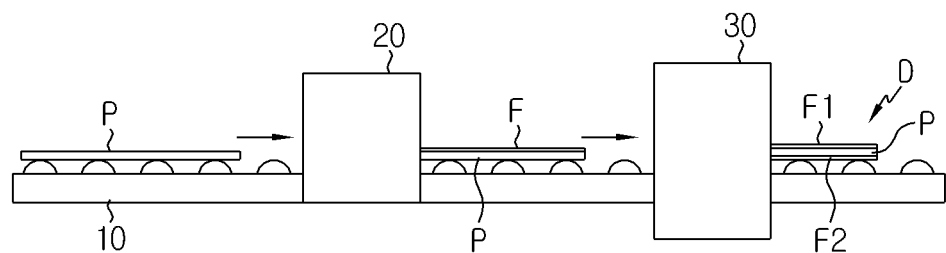
FIG. 5 is a conceptual diagram illustrating a system for laminating an optical film according to an exemplary embodiment of the present disclosure.

FIG. 5 is a conceptual diagram illustrating a system for laminating an optical film according to an exemplary embodiment of the present disclosure.

Referring to FIG. 5, the system for laminating an optical film according to an exemplary embodiment of the present disclosure includes a panel transfer unit 10, a first laminating unit 20, and a second laminating unit 30.

The panel transfer unit 10 transfers, within the system, a panel P to which an optical film F is to be attached, and has a width corresponding to a width of the panel P.

As a means for supporting and conveying the panel P, various transfer means such as a conveyor belt or a transfer roller may be used.

The first laminating unit 20 and the second laminating unit 30 are installed on a transfer line of the panel P to laminate optical films F1 an F2 on a first surface and an opposing second surface of the panel P, respectively.

Specific functions and construction of the first laminating unit 20 and the second laminating unit 30 will be described below in more detail with reference to FIGS. 6 through 10.

First, a laminating direction on the first surface of the panel P and a laminating direction on the second surface are described with reference to FIG. 6.

Figure 6:
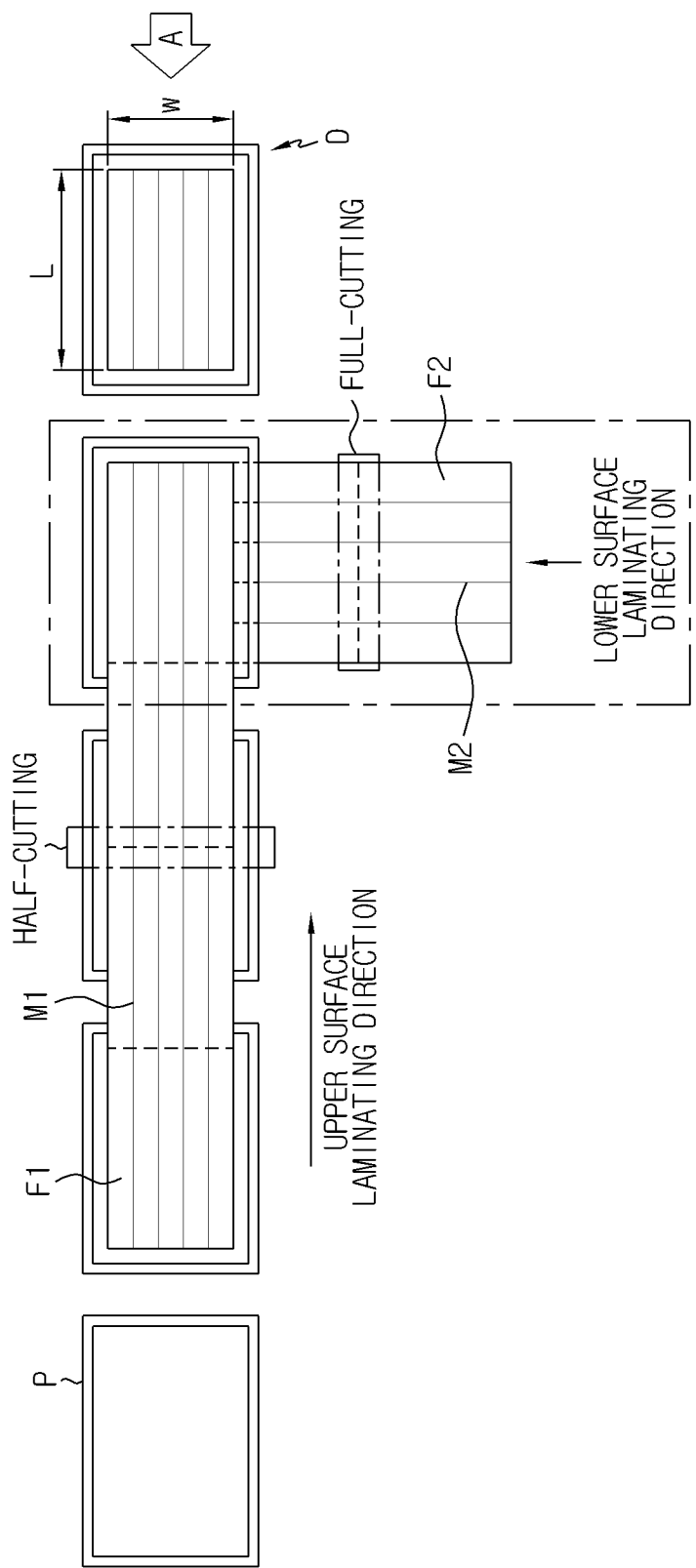
FIG. 6 is a diagram illustrating a laminating direction of an optical film by a first laminating unit and a second laminating unit shown in FIG. 5.

FIG. 6 is a diagram illustrating a laminating direction of an optical film by the first laminating unit and the second laminating unit shown in FIG. 5.

Referring to FIG. 6, the optical film F1 to be laminated on the first surface of the panel P and the optical film F2 to be laminated on the second surface are laminated along directions approximately perpendicular to each other.

That is, referring to FIGS. 5 and 6 together, the first laminating unit 20 laminates the optical film F1 on the first surface of the panel P along a direction parallel to a transfer direction of the panel P, while the second laminating unit 40 laminates the optical film F2 on the second surface of the panel P along a direction approximately perpendicular to the transfer direction of the panel P.

Different laminating directions of the optical films F1 and F2 on both surfaces of the panel P is because absorption axes M1 and M2 formed for each of the optical films F1 and F2 should be perpendicular to each other, particularly, in case in which the optical films F1 and F2 attached onto both surfaces of the panel P are a polarizing film.

As described above, because the laminating directions of the optical films F1 and F2 attached onto both surfaces of the panel P are perpendicular to each other, a length L of the film F1 to be laminated on the first surface is equal to a width of the film F2 to be laminated on the second surface, and a width W of the film F1 to be laminated on the first surface is equal to a length of the film F2 to be laminated on the second surface.

Subsequently, a structure of the first laminating unit 20 is described in more detail with reference to FIG. 7.

Figure 7:
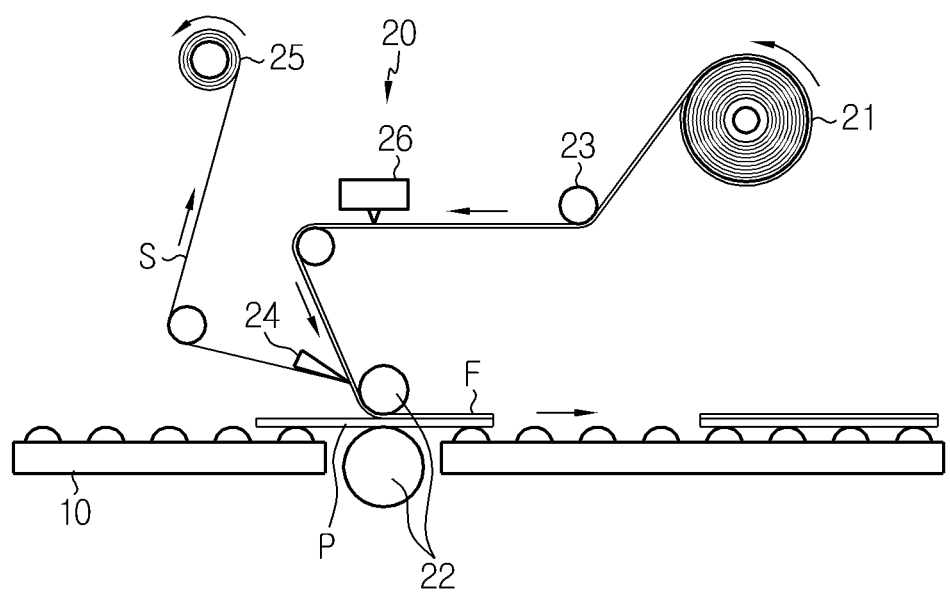
FIG. 7 is a diagram illustrating an example of implementation of a first laminating unit shown in FIG. 5.

FIG. 7 is a diagram illustrating an example of implementation of the first laminating unit shown in FIG. 5.

Referring to FIG. 7, the first laminating unit 20 may be implemented to include a first supply roll 21, on which the optical film F with the release sheet S attached onto one surface is wound, to supply the optical film F, and a pair of laminating rolls 22 to laminate the optical film F separated from the release sheet S on the first surface of the panel P along the transfer direction of the panel P.

The laminating roll 22 may include a first roll disposed on the first surface of the panel P being transferred and a second roll disposed on the second surface.

Also, the first laminating unit 20 may further include at least one tension roll 23 to maintain tension of the optical film F between the first supply roll 21 and the laminating roll 22.

Meanwhile, the first laminating unit 20 may include a release sheet remover 24 disposed between the first supply roll 21 and the laminating roll 22 to separate, from the optical film F, the release sheet S attached to the optical film F, and in this case, may further include a collector roll 25 to collect the separated release sheet S.

Additionally, the first laminating unit 20 may further include a first cutter 26 disposed between the first supply roll 21 and the release sheet remover to half-cut the optical film F into a predetermined length.

Here, half-cutting represents cutting only the optical film F while leaving the release sheet S intact, when tailoring the optical film F with the attached release sheet S into a predetermined length. Half-cutting allows for continuous supply and laminating of the optical film F using a roll.

Meanwhile, although FIG. 7 of the present disclosure only shows that the optical film F is laminated on the panel P while passing through between the pair of laminating rolls 22, the present disclosure is not limited thereto.

That is, a method of laminating the optical film F on the first surface of the panel P is enough if continuous laminating is enabled by a roll to panel (RTP) technology, and thus, other laminating means such as, for example, a laminating drum (see FIG. 8) may be used in place of the laminating roll 22.

Subsequently, a structure of the second laminating unit 30 is described in more detail with reference to FIGS. 8 through 10.

Figure 8:
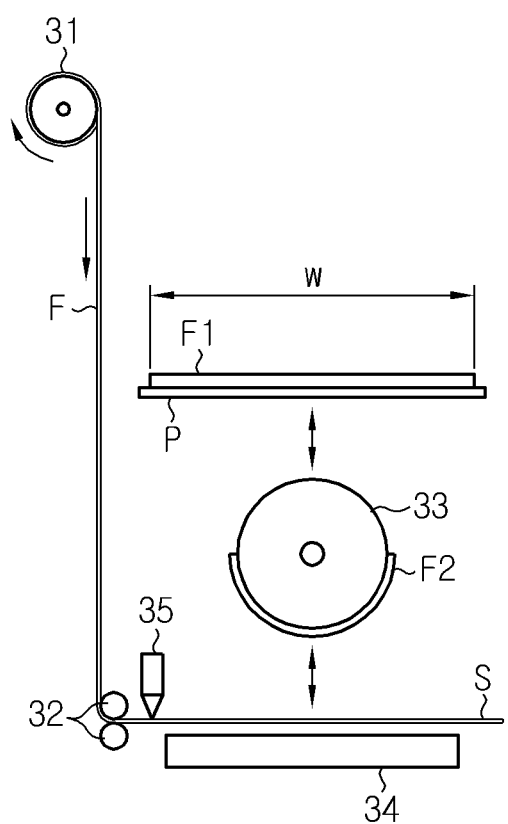
FIG. 8 is a diagram illustrating an example of implementation of a second laminating unit shown in FIG. 5, when viewed from A in FIG. 6.
Figure 9:
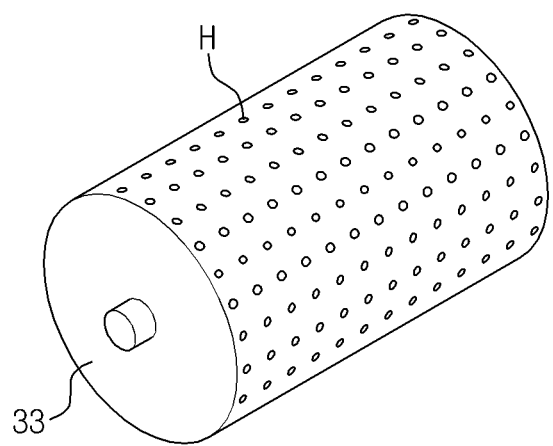
FIG. 9 is a diagram illustrating an example of implementation of a laminating drum shown in FIG. 8.
Figure 10:
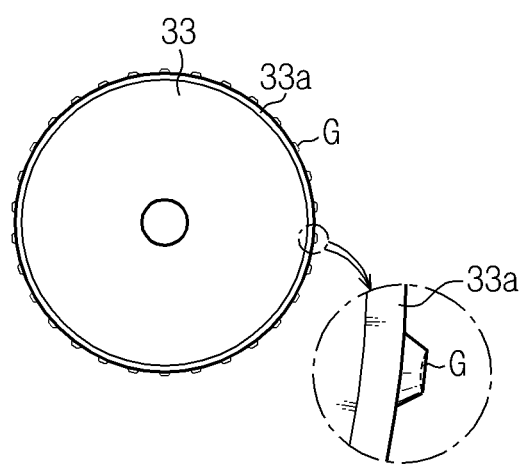
FIG. 10 is a diagram illustrating another example of implementation of a laminating drum shown in FIG. 8.

FIG. 8 is a diagram illustrating an example of implementation of the second laminating unit shown in FIG. 5, when viewed from A in FIG. 6, FIG. 9 is a diagram illustrating an example of implementation of a laminating drum shown in FIG. 8, and FIG. 10 is a diagram illustrating another example of implementation of a laminating drum shown in FIG. 8.

First, referring to FIG. 8, the second laminating unit 30 may be implemented to include a second supply roll 31, a direction change roll 32, a laminating drum 33, a film holder 34, and a second cutter 35.

The second supply roll 31, on which the optical film F2 having the release sheet S attached onto one surface is wound, supplies the optical film F2 along a direction perpendicular to the panel P.

That is, the second supply roll 31 minimizes an area occupied by equipment by minimizing an overall width of the system for laminating an optical film required for supply of the optical film F.

The laminating drum 33 is disposed between the optical film F moving along a changed movement direction by the direction change roll 32, that is, a direction parallel to the panel P and the second surface of the panel P.

The laminating drum 33 has an approximately cylindrical shape, and separates the optical film F from the release sheet S and laminates the optical film F on the second surface of the panel P while moving between the panel P and the optical film F.

Meanwhile, the laminating drum 33 may have various adsorption structures for attaching the optical film F on the periphery thereof, and an example of the adsorption structure is illustrated in FIGS. 9 and 10.

First, referring to FIG. 9, the laminating drum 33 may have a plurality of adsorption holes H formed on the periphery. In this case, an inner space of the laminating drum 33 may be connected to a vacuum pump (not shown), and as the vacuum pump operates, the optical film F may be adsorbed onto the periphery of the laminating drum 33.

Subsequently, referring to FIG. 10, an adsorption pad 33a having a plurality of adsorption grooves G may be attached onto the periphery of the laminating drum 33.

As described above, with the surface structure capable of adsorbing the optical film F, the laminating drum 33 adsorbs the optical film F separated from the release sheet S onto the periphery, and then moves toward the panel P and laminates the optical film F on the second surface of the panel P along the direction of the width W of the panel P.

In this instance, adhesion between the panel P and the optical film F is achieved by an adhesive layer formed on a surface where the release sheet S has been attached among both surfaces of the optical film F.

The film holder 34 is disposed opposite to the laminating drum 33 across the optical film F, and serves to hold the release sheet S to allow the release sheet S attached to the optical film F to be separated.

The film holder 34 is not limited to a specific structure as long as it has a structure capable of holding the release sheet S to allow the release sheet S to be separated from the optical film F when the laminating drum 33 adsorbs the optical film F and moves toward the panel P, and for example, the adsorption structure applied to the laminating drum 33 shown in FIG. 9 may be applied.

The second cutter 35 is disposed between the second supply roll 31 and the film holder 34, and full-cuts the optical film F having the release sheet S attached on one surface, so that the optical film F having a predetermined length may be attached/moved to/by the laminating drum 33 individually and laminated on the panel P.

Here, full-cutting represents cutting all the optical film F and the release sheet S attached onto one surface of the optical film F, as opposed to half-cutting representing cutting only the optical film F while leaving the release sheet intact, and a cutting length of the optical film F is determined based on the width W of the panel P.

Meanwhile, although not shown in FIG. 8 of the present disclosure explicitly, the optical film F may be full-cut in advance before arriving at the film holder 34 and then transferred to the film holder 34 by a separate transfer machine.

When full-cutting is performed, a length of the optical film F may be limited to less than a predetermined level, so flatness maintenance is made easy and consequently precision of an operation increases, resulting in an advantage of improved quality of attachment of the optical film F.

Meanwhile, in the laminating of the optical film F on the second surface of the panel P, a roll type using the supply roll 31 for continuous supply of the optical film F as described in the foregoing may be applied, but as opposed to this, a chip type in which the optical film F full-cut to a size of the panel P in advance is transferred to the laminating drum 33 using a separate transfer machine may be applied.

Figure 11:
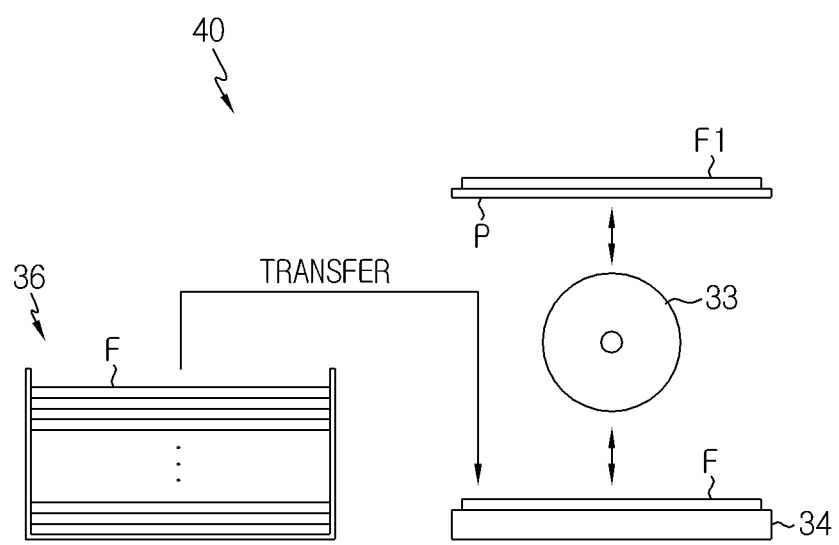
FIG. 11 is a diagram illustrating implementation of a second laminating unit of a different type from that of FIG. 8.

A detailed description of laminating in a chip type is provided with reference to a second laminating unit 40 shown in FIG. 11.

FIG. 11 is a diagram illustrating implementation of a second laminating unit of a different type from that of FIG. 8.

Referring to FIG. 11, the second laminating unit 40 includes a film cartridge 36 to contain a plurality of optical films F as full-cut to the size of the panel P in advance, instead of omitting the second supply roll 31, the direction change roll 32, and the second cutter 35, when compared to the second laminating unit 30 described in the foregoing.

Meanwhile, although not shown in the drawing explicitly, transfer of the optical film F between the film cartridge 36 and the film holder 34 may be made by a separate transfer device.

Furthermore, the supply of the optical film F by the full-cutting method may be applied when laminating the optical film F on the first surface of the panel P, and in this case, a roll type and a chip type may be all applied as a transfer type of the optical film F.

Also, although the drawing (particularly, FIG. 6) of the present disclosure only shows that laminating on the first surface of the panel P (laminating along a direction parallel to the movement direction of the panel) and laminating on the second surface (laminating along a direction perpendicular to the movement direction of the panel) are performed at different points in time and that laminating on the first surface is performed before laminating on the second surface, the present disclosure is not limited thereto.

That is, laminating on the first surface and laminating on the second surface may be simultaneously performed, and laminating on the second surface may be performed before laminating on the first surface.

As described above, in the manufacture of the display unit D by laminating the optical film on both surfaces of the panel, the system for laminating an optical film according to the present disclosure is constructed to allow the laminating direction on the first surface and the laminating direction on the second surface to be performed along directions approximately perpendicular to each other. Therefore, in accordance with the system for laminating an optical film according to the present disclosure, a separate process of rotating and/or reversing a panel or an optical film is not required to allow absorption axes of optical films being attached to both surfaces to be perpendicular to each other.

Also, due to being constructed to allow the optical film to be supplied along a direction perpendicular to the panel in performing the laminating along a direction perpendicular to the movement direction of the panel, the system for laminating an optical film according to the present disclosure may maximize spatial efficiency by minimizing a width occupied by equipment.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A system for laminating an optical film, comprising:
a panel transfer unit to transfer a panel along a straight line;
a first laminating unit installed on a straight transfer line of the panel to laminate first optical film on a first surface of the panel along a first direction parallel to a transfer direction of the panel along the straight transfer line; and
a second laminating unit installed on the straight transfer line of the panel to laminate second optical film full-cut into a predetermined length on a second surface of the panel along a second direction, which is perpendicular to the transfer direction of the panel along the straight transfer line and parallel to a surface of the panel,
wherein the second laminating unit comprise:
a laminating drum;
a cutter;
a second supply roll to supply a second optical film along a direction perpendicular to a surface of the panel; and
a direction change roll to change a direction to allow the second optical film, which is supplied by the second supply roll, to move along the second direction with the second optical film facing the second surface of the panel.

2. The system for laminating an optical film according to claim 1, wherein the panel transfer unit includes a conveyor belt to support and convey the panel.

3. The system for laminating an optical film according to claim 1, wherein the panel transfer unit includes a transfer roller to support and convey the panel.

4. The system for laminating an optical film according to claim 1, wherein the panel transfer unit has a width corresponding to a width of the panel.

5. The system for laminating an optical film according to claim 1, wherein the first laminating unit comprises:
a first supply roll to supply the first optical film; and
a laminating roll to laminate the supplied first optical film on the panel.

6. The system for laminating an optical film according to claim 5, wherein the first laminating unit comprises a release sheet remover disposed between the first supply roll and the laminating roll to separate a release sheet attached to the first optical film.

7. The system for laminating an optical film according to claim 6, wherein the first laminating unit comprises a collector roll to collect the release sheet separated from the first optical film.

8. The system for laminating an optical film according to claim 6, wherein the first laminating unit comprises a cutter disposed between the first supply roll and the release sheet remover to half-cut the first optical film into a predetermined length.

9. The system for laminating an optical film according to claim 1, wherein the first laminating unit comprises:
a first supply roll to supply the first optical film; and
a laminating drum to laminate the supplied first optical film on the panel.

10. The system for laminating an optical film according to claim 1, wherein the
laminating drum of the second laminating unit is disposed between the second optical film facing the second surface of the panel and the second surface of the panel.

11. The system for laminating an optical film according to claim 10, wherein the second laminating unit comprises a film holder disposed opposite to the laminating drum across the second optical film to hold a release sheet to allow the release sheet attached to the second optical film to be separated.

12. The system for laminating an optical film according to claim 11, wherein the cutter of the second laminating unit is disposed between the second supply roll and the film holder to full-cut the second optical film into a predetermined length.

13. The system for laminating an optical film according to claim 10, wherein the laminating drum separates and adsorbs the second optical film held by a film holder and laminates the second optical film on the second surface of the panel.

14. The system for laminating an optical film according to claim 10, wherein the laminating drum has an adsorption hole formed on a periphery.

15. The system for laminating an optical film according to claim 10, wherein an adsorption pad is attached onto the periphery of the laminating drum.

* * * * *